US008778158B2

(12) United States Patent
Medoro et al.

(10) Patent No.: US 8,778,158 B2
(45) Date of Patent: Jul. 15, 2014

(54) METHOD AND DEVICE FOR THE MANIPULATION OF PARTICLES BY OVERLAPPING FIELDS OF FORCE

(75) Inventors: Gianni Medoro, Casalecchio di Reno (IT); Nicolò Manaresi, Bologna (IT)

(73) Assignee: Silicon Biosystems S.p.A., Bologna (IT)

( * ) Notice: Subject to any disclaimer, the term of this patent is extended or adjusted under 35 U.S.C. 154(b) by 0 days.

(21) Appl. No.: 13/591,920

(22) Filed: Aug. 22, 2012

(65) Prior Publication Data

US 2013/0043133 A1 Feb. 21, 2013

Related U.S. Application Data

(63) Continuation of application No. 12/376,761, filed as application No. PCT/IB2007/002255 on Aug. 6, 2007, now Pat. No. 8,268,151.

(30) Foreign Application Priority Data

Aug. 7, 2006 (IT) .............................. TO2006A0586

(51) Int. Cl.
*G01N 27/447* (2006.01)
*B03C 5/02* (2006.01)

(52) U.S. Cl.
CPC ...................................... *B03C 5/026* (2013.01)
USPC ........................................... 204/547; 204/643

(58) Field of Classification Search
CPC ....................................................... B02C 5/026
USPC .................................................. 204/547, 643
See application file for complete search history.

(56) References Cited

U.S. PATENT DOCUMENTS

| | | | |
|---|---|---|---|
| 6,113,768 | A | 9/2000 | Fuhr et al. |
| 6,185,084 | B1 | 2/2001 | Tai et al. |
| 2002/0036141 | A1 | 3/2002 | Gascoyne et al. |
| 2003/0047456 | A1 | 3/2003 | Medoro |

FOREIGN PATENT DOCUMENTS

| | | |
|---|---|---|
| EP | 1185373 | 8/2004 |
| GB | 1 362 232 | 7/1974 |
| WO | WO-00/47322 | 8/2000 |
| WO | WO-00/69565 | 11/2000 |
| WO | WO-2007/010367 | 1/2007 |

OTHER PUBLICATIONS

International Search Report of PCT/IB2007/002255 mailed Feb. 7, 2008.

*Primary Examiner* — J. Christopher Ball
(74) *Attorney, Agent, or Firm* — Venable LLP; Robert Kinberg

(57) ABSTRACT

Methods and related devices are illustrated for generating time-variable electric fields suitable for determining the creation of closed dielectrophoretic cages able to trap inside even single particles without the cages being necessarily positioned at relative minimum points of the electric field.

23 Claims, 8 Drawing Sheets

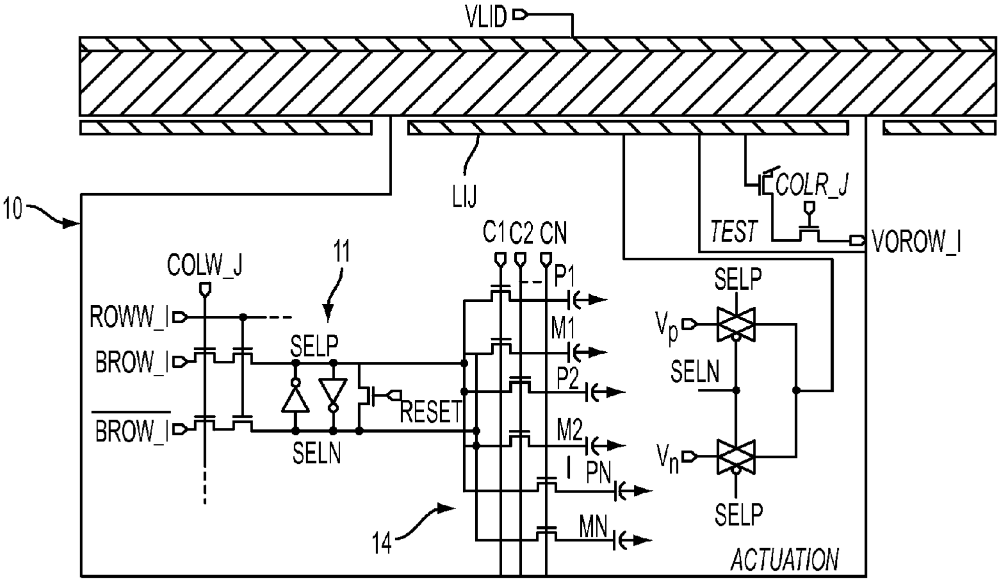
FIG. 14
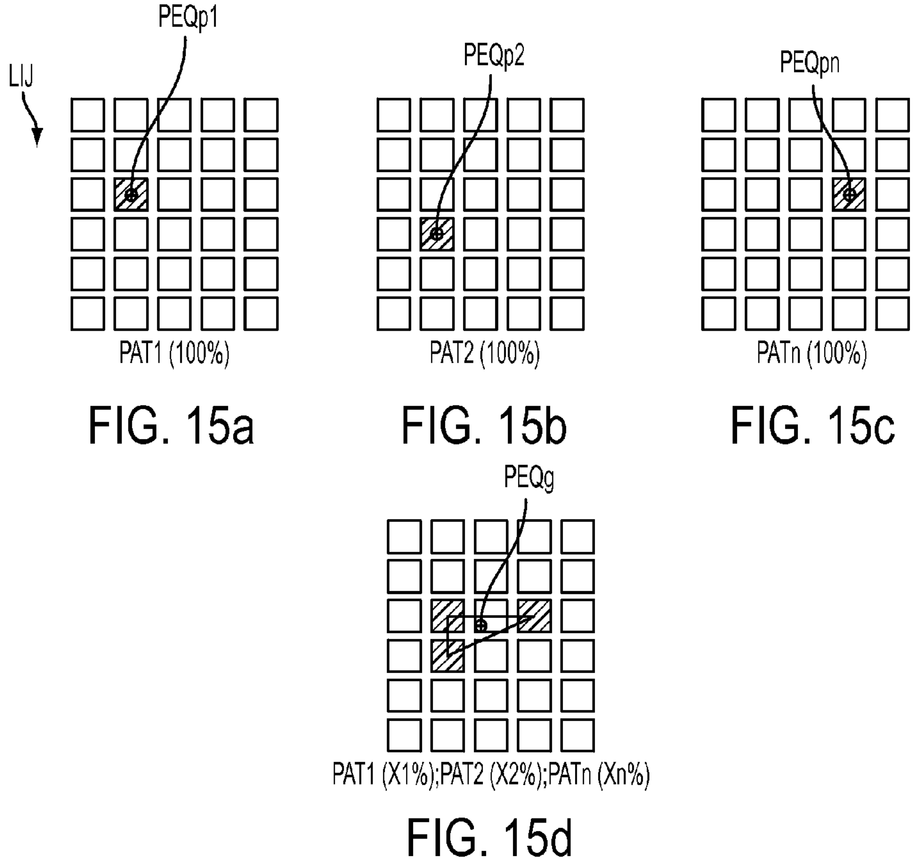
FIG. 15a FIG. 15b FIG. 15c
FIG. 15d

METHOD AND DEVICE FOR THE MANIPULATION OF PARTICLES BY OVERLAPPING FIELDS OF FORCE

CROSS-REFERENCE TO RELATED APPLICATION

This application is a continuation of U.S. application Ser. No. 12/376,761 filed Jun. 5, 2009 now U.S. Pat. No. 8,268,151, which is a National Stage of PCT/IB2007/002255, filed Aug. 6, 2007 which claims the priority of Italian Patent No. TO2006A000586, filed Aug. 7, 2006, the subject matter of the forgoing applications being incorporated herein by reference in their entirety.

TECHNICAL FIELD

The present invention concerns methods and miniaturised equipment for the manipulation of particles. The invention is applied mainly in the implementation of biological protocols on reduced-volume cell samples; or which require accurate control of individual cells or particles.

STATE OF THE ART

The European patent n. EP1185373 (and the recent Italian patent application BO2005A000481, Medoro et al.), describes a device and some methods for manipulating particles by means of arrays of electrodes.

The method described teaches how to control the position of each particle independently of all the others in a two-dimensional space. The force used to trap the particles in suspension is negative dielectrophoresis. In particular the cited patent teaches how to trap particles in a stable manner via the use of negative closed dielectrophoretic cages, the centre of which is identified, according to the classic representation of the theory of dielectrophoresis, with the position of a local minimum of the electric field. The manipulation operations are individually controlled by the programming of memory and circuit elements associated with each element of an array of electrodes integrated in the same substrate.

The same patent also describes an apparatus for the manipulation of particles via the use of closed dielectrophoretic potential cages.

This device consists of two basic modules; the first consists of a regular distribution of electrodes (M1 in FIG. 1) arranged an insulating support (O1 in FIG. 1). The electrodes can be made of any conductive material with a preference for metals compatible with the technology of electronic integration, while the insulating means can be silicon oxide or any other insulating material.

The electrodes of the array can be of various shapes; FIG. 1 shows electrodes with square form. Each element of the array M1 consists of an electrode (LIJ in FIG. 1) to generate the dielectrophoretic cage (S1 in FIG. 1) for manipulation of the biological sample (BIO in FIG. 1), and the whole process takes place in a liquid or semi-liquid environment (L in FIG. 1).

In the region below the electrodes (C in FIG. 1) there can be located integrated circuits for sensing, i.e. sensors, which can be of various types, able to detect the presence of the particle inside the potential cages generated by the electrodes.

In the preferred embodiment the second main module consists substantially of one single large electrode (M2 in FIG. 1) which covers the entire device. Lastly, there may be an upper supporting structure (O2 in FIG. 1).

The simplest form for this electrode is that of a flat uniform surface; other more or less complex forms are possible (for example a more or less fine-mesh grille to allow the light to pass through).

To implement this manipulation technique it is necessary to provide and stimulate, by means of appropriate electrical voltages, an array of electrodes, the geometric form and spatial distribution of which are fundamental for the minimisation of two undesired effects:

1. Parasite cages: i.e. undesired dielectrophoresis cages which can act as traps for the particles, removing some elements of the sample from the control of the system. These traps occur typically between electrodes powered with the same phase. To reduce the effects of these parasite cages it is necessary to reduce the basin of attraction so that it is smaller than the particles and therefore not large enough to accommodate a particle. This is done, according to the known art, by reducing the gap between the electrodes, which results in the increase of a second negative effect, i.e. power consumption.
2. Dissipation of power: by reducing the distance between the electrodes, the impedance between the electrodes is reduced, thus increasing the current and therefore the dissipation of power. This dissipation of power causes an increase in the temperature which is lethal for the cells and the system itself. In order to control the temperature, according to the known art, it is possible to reduce the conductivity of the liquid (by creating a non-physiological environment for the cells and therefore inhibiting some biological processes) either by extracting the heat from the outside by means of complex and cumbersome cooling systems (such as heat pumps) or by reducing the voltages and therefore drastically slowing down the process of manipulation of the cells and increasing the duration of the protocols.

The control and minimisation of these effects is essential for the practical realisation of apparatuses for individual manipulation of a plurality of particles, in particular for point-of-care applications.

These effects are, however, closely interlinked, and therefore reduction in the entity of one involves an increase in the other.

It is an object of the present invention to provide a method and apparatus or device for the manipulation of particles based on dielectrophoresis, overcoming the limits that characterise the techniques of the known art.

SUMMARY OF THE INVENTION

The present invention concerns methods and devices for the realisation of dielectrophoretic fields of force in order to obtain a substantial reduction in the effects of parasite cages and in power dissipation, by creating closed dielectrophoretic cages for the manipulation of particles without the cages necessarily having to be located at local minima of the electric field.

A method according to the invention can be used, as a non-limiting example for the purposes of the present invention, for the realisation of closed dielectrophoretic cages by overlapping the effects of N different configurations of force, each of which does not necessarily have a corresponding electric field minimum at the centre of the dielectrophoretic cage.

It is also an object of present invention to provide a method for the reduction of the effects of parasite cages and dissipated power obtained via the use of auxiliary electrodes, in addition to devices for implementing the above-mentioned methods in a particularly advantageous manner.

In particular, the manipulation of particles by means of closed dielectrophoretic cages is performed according to a method comprising the step of generating at least one closed dielectrophoretic cage so as to trap at least one particle inside it, and the step of moving the closed cage along a controlled path, in which said at least one closed dielectraphoretic cage is generated and moved by applying around the particle an electric field variable in time by means of an array of first electrodes which can be individually addressed and activated and by means of at least one second electrode positioned facing towards and spaced apart from the first electrodes so as to delimit between itself and said array of first electrodes a chamber suitable for containing said particles in suspension in a fluid medium; wherein the step of generating at least one closed dielectrophoretic cage is performed by applying to at least one said first electrode at which said at least one cage is to be generated a voltage configuration in phase with a voltage configuration applied to said at least one second electrode, and to a group of first electrodes of the array immediately surrounding the cage to be generated a succession over time of different voltage configurations such that at least one of said first electrodes of said group is always in counter-phase with the voltage configuration applied to the second electrode.

According to a further aspect of the invention, the manipulation of particles by means of closed dielectrophoretic cages is performed by applying to at least one first group of first electrodes of the array of electrodes corresponding to each of which said at least one cage is to be generated, a voltage configuration in phase with a voltage configuration applied to the second electrode, and by applying to at least one second group of first electrodes immediately surrounding the cage to be generated a voltage configuration in counter-phase with the voltage configuration applied to the second electrode; and, simultaneously, by generating a localised increase in the intensity of the electric field in regions of said chamber containing, positioned immediately adjacent to one other, first electrodes to which voltage configurations having identical phase are applied.

Here and below, the terms "particles" or "particle" indicate micrometric or nanometric entities, natural or artificial, such as cells, subcellular components, viruses, liposomes, niosomes, microspheres and nanospheres, or even smaller entities such as macro-molecules, proteins, DNA, RNA, etc., and drops of a fluid immiscible in a suspension medium, for example oil in water, or water in oil, or also drops of liquid in a gas (such as water in air) or, further, bubbles of gas in a liquid (such as air in water).

At times the term cell will be used, but where not otherwise specified, it shall be understood as a non-limiting example of particles in the wider sense described above.

Further characteristics and advantages of the invention will clearly emerge from the following description of some of its non-limiting embodiments, with reference to the figures of the accompanying drawings.

BRIEF DESCRIPTION OF THE FIGURES

FIG. 14 shows schematically a preferred embodiment alternative to that of FIG. 12 of a device suitable for the implementation of the methods based on the use of the configurations of potentials illustrated in FIGS. from 6 to 10; and FIG. 15 shows, schematically, a plan view of the result of the application of n field configurations to an array of electrodes according to any one of the methodologies illustrated in FIGS. 6-10.

DETAILED DISCLOSURE

Figure 1:
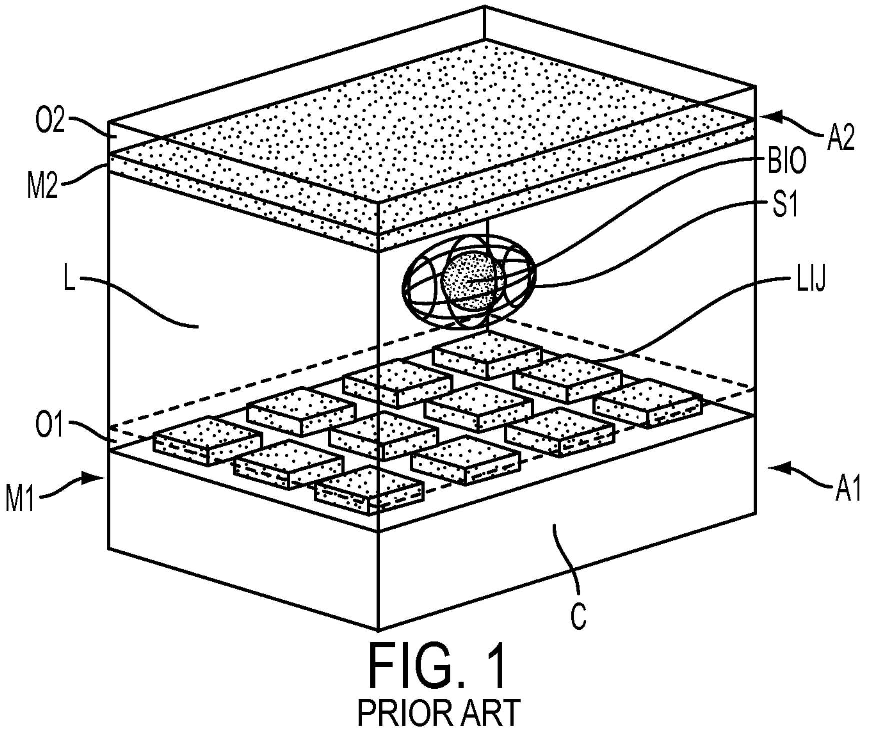
FIG. 1 PRIOR ART
FIG. 1 shows a diagram of the device for the manipulation of particles by means of closed dielectrophoretic cages, according to the known art.

The object of the present invention is to provide a method and a device or apparatus for the manipulation and stable control of single particles or groups of particles by dielectrophoretic force, so as to obtain one or more of the following advantages with respect to the known art:

- greater accuracy in the control of the position of the particles;
- reduction of the undesired effects due to the presence of parasite cages;
- reduction of power consumption.

Dielectrophoretic Force

Dielectrophoresis is a physical phenomenon by which a net force is exerted on a dielectric body when it is subjected to a non-uniform continuous and/or alternating electric field, said force acting towards the spatial regions in which the intensity of the field is increasing (pDEP) or decreasing (nDEP). If the intensity of the forces is comparable to that of the weight force, it is possible, in principle, to create a balance of forces to obtain the levitation of small bodies. The intensity of the dielectrophoretic force, like the direction in which it acts, depends on the dielectric and conductive Properties of the body and the medium in which the body is immersed, properties which vary according to the frequency. According to the classic theory of force we can write:

$$\overline{F}(x,y,z\omega)=2\pi\epsilon_0\epsilon_m R^3\,\Re\{f_{CM}(\omega)\}\nabla E_{(RMS)}^2 \quad (1)$$

in which $\in_0$ and $\in_m$ represent the permittivity of vacuum and of the suspension medium respectively, R is the particle radius, $f_{CM}$ the Clausius-Mossotti factor and $E_{RMS}$ the root-mean-square value of the electric field.

Assuming the particle to be a sphere having mass M and radius R, immersed in a fluid with viscosity η, the equation that governs the dynamics of the system is the following:

$$M\frac{d^2\vec{r}(t)}{dt} = \vec{F}(t) - V(\rho_p - \rho_m)g\hat{k} - 6\pi R\eta\frac{d}{dt}\vec{r}(t) \quad (2)$$

where $\rho_p$ and $\rho_m$ indicate the mass density of particle and medium respectively and g is the gravitational acceleration. If we assume for the sake of simplicity that the force acts in the vertical direction and that the weight force does not act on the system, then we will have:

$$M\frac{d}{dt}z'(t) = F(t) - 6\pi R\eta z'(t) \quad (3)$$

where the superscript indicates the derivative with respect to time. In the domain of the frequencies, we can write:

$$Mj\omega Z'(\omega)=F(\omega)-6\pi R\eta Z'(\omega) \quad (4)$$

from which the system transfer function is obtained:

$$H(\omega) = \frac{Z'(\omega)}{F(\omega)} = \left(\frac{1}{6\pi R\eta}\right)\frac{1}{1+j\omega\tau} \quad (5)$$

in which $$\tau = \frac{M}{6\pi R\eta} \quad (6)$$

is defined.

If for example we consider a particle with a radius of 50 μm with unitary mass density immersed in water at a temperature of 20° C., the cut-off pulsation is 1.8 kHz. Therefore periodical variations of forces with pulsations above this value are filtered by the particle-liquid system which undergoes exclusively the mean effect thereof. The main result of the above is that if we apply N different configurations in a sequential manner (deterministic or chaotic) with repetition frequency (in the case of periodic repetition of the sequence) higher than the cut-off frequency of the inertial system of the particles, the effect on the particle is substantially due to the mean effect in time.

Overlapping of Effects Applied to Dielectrophoresis

For the sake of simplicity, but without limitations to the generality of the theory, we shall limit ourselves to considering the particular case in which all the N configurations of sinusoidal potentials that generate the N fields of dielectrophoretic force are periodicals with pulsation ω. Said N configurations are applied in time sequence, for the sake of simplicity in a deterministic and non-chaotic way. Let T be the repetition period of said time sequence and $\Delta t_i$ the time window in which each configuration "i" is applied. We define a function which associates a time succession of periodic field configurations with each point in space; said function can be represented as follows:

$$\overline{E}(x,y,z,\omega,t)=\Sigma_{i=1}^{n}[\overline{E}_i(x,y,z,\omega)C_i(t)] \quad (7)$$

where E represents the electric field and where we have defined:

$$C_i(t) = \begin{cases} 1 & iT < t < iT + \Delta t_i \\ 0 & iT + \Delta t_i < t < (i+1)T. \end{cases} \quad (8)$$

Figure 2:
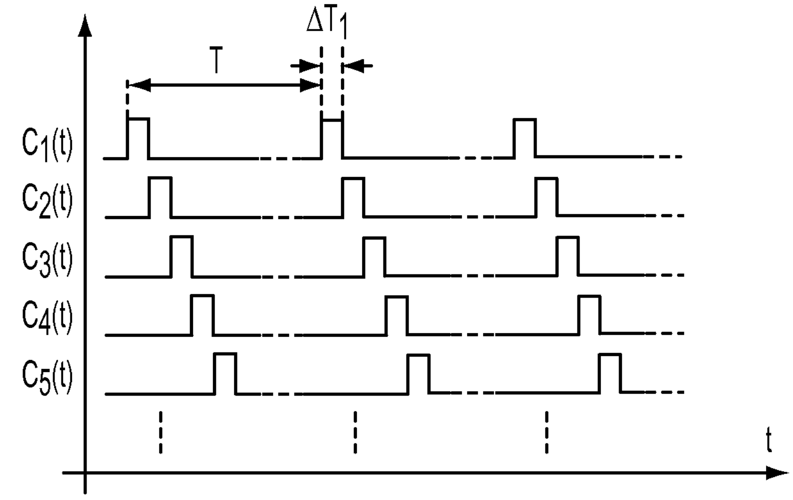
FIG. 2 shows a sequence of the time slots in which different configurations of potentials are applied.

The overall field is given by the algebraic sum of N configurations of field $E_i$ each of which has effect in a time window determined by the function $C_n$ as shown better in FIG. 2.

It is also possible to express a force for each configuration of electric field; said force can be expressed as the gradient of a scalar function which we identify as potential of the dielectrophoretic force:

$$\overline{F}_i(x,y,z,\omega)=-\nabla U_i^{dep}(x,y,z,\omega)=\beta(\omega)\nabla E_{i(RMS)}^2 \quad (9)$$

in which we have defined:

$$\beta(\omega)=2\pi\in_0\in_m R^3\,\Re\{f_{CM}(\omega)\} \quad (10)$$

The term β summarises all the properties of the medium and particle and is a function independent of the geometry of the system and of the spatial characteristics of the field applied; it depends on the pulsation of the electric field.

We can write the total dielectrophoretic potential as a sum of the potentials of each configuration multiplied by the time function which identifies the time slot for application of each configuration; in other words we can write:

$$\overline{F}(x,y,z,\omega,t)=\Sigma_{i=1}^{n}[-\nabla U_i^{dep}(x,y,z,\omega)C_i(t)] \quad (11)$$

Due to the fact that the function $C_i$ does not contain the spatial variable, said expression can be reformulated in simple algebraic steps as follows:

$$\overline{F}(x,y,z,\omega,t)=-\nabla\{\Sigma_{i=1}^{n}[U_i^{dep}(x,y,z,\omega)C_i(t)]\} \quad (12)$$

It is therefore possible to define the overall dielectrophoretic potential as follows:

$$U_{dep}(x,y,z,\omega,t)=\Sigma_{i=1}^{n}[U_i^{dep}(x,y,z,\omega)C_i(t)] \quad (13)$$

At this point it is sufficient to re-write this time function as a Fourier expansion as follows:

$$U_{dep}(x,y,z,\omega,t)=\left\langle U_{dep}(x,y,z,\omega,t)\right\rangle + \quad (14)$$

where the symbol < > indicates the time mean calculated as an integral with respect to the time variable (in the domain T) divided by the period. If the repetition period of the configurations is below the limit of the cut-off frequency of the liquid-particle system transfer function, then we can ignore the higher order terms and consider only the constant term, i.e. if:

$$T < \frac{M}{6\pi R\eta} \quad (15)$$

then:

$$\left\langle U_{dep}(x,y,z,\omega,t)\right\rangle = U_{dep}^{(0)}(x,y,z,\omega)=\left\langle \Sigma_{i=1}^{n}[U_i^{dep}(x,y,z,\omega)C_i(t)]\right\rangle \quad (16).$$

The potential function can obviously be within the integral because it does not contain the time variable and we can therefore write:

$$U_{dep}^{(0)}(x,y,z,\omega)=\Sigma_{i=1}^{n}[U_i^{dep}(x,y,z,\omega)\left\langle C_i(t)\right\rangle] \quad (17).$$

Redefining:

$$\left\langle C_i(t)\right\rangle = C_i^{(0)} \tag{18}$$

we obtain the final expression:

$$U_{dep}^{(0)}(x,y,z,\omega)=\Sigma_{i=1}^{n}[U_i^{dep}(x,y,z,\omega)C_i^{(0)}] \tag{19}$$

from which:

$$\vec{F}(x,y,z,\omega,t)=-\nabla\{U_{dep}^{(0)}(x,y,z,\omega)\}=-\nabla\{\Sigma_{i=1}^{n}[U_i^{dep}(x,y,z,\omega)C_i^{(0)}]\} \tag{20}$$

This means that point by point the total potential of the dielectrophoretic force is given by the sum of all the dielectrophoretic potentials (the various configurations that alternate do not necessarily have to be produced with electric fields alternating at the same frequency) of each configuration which alternates in time multiplied by a weight which is given by the time mean of the function $C_i$ which represents the duration with respect to the repetition period of said configuration.

Recalling the definition of the time function of $C_i$ we can write:

$$C_i^{(0)} = \frac{\Delta t_i}{T} \tag{21}$$

hence:

$$\vec{F}(x, y, z, \omega) = -\vec{\nabla}\{U_{dep}^{(0)}(x, y, z, \omega)\} = -\vec{\nabla}\left\{\sum_{i=1}^{n}\left[U_i^{dep}(x, y, z, \omega)\frac{\Delta t_i}{T}\right]\right\}. \tag{22}$$

In other words we can write:

$$\vec{F}(x, y, z, \omega) = \beta(\omega)\sum_{i=1}^{n}\left[\frac{\Delta t_i}{T}\vec{\nabla}E_{i,RMS}^2(x, y, z, \omega)\right]. \tag{23}$$

This expression is valid in the particular case in which the electric field that generates each configuration has pulsation ω. In more generic terms, if each configuration that contributes to the total force is characterised by a different pulsation of the electric field, then the expression becomes the following:

$$\vec{F}(x, y, z, \omega) = \sum_{i=1}^{n}\left[\frac{\Delta t_i}{T}\beta_i(\omega_i)\vec{\nabla}E_{i,RMS}^2(x, y, z, \omega_i)\right]. \tag{24}$$

This formula mathematically represents the concept of overlapping of effects. In other words, the dielectrophoretic force is given by the sum of the various contributions of each electric potential configuration which alternates in time, the weight of each of the configurations being determined by the duration of the interval in which said configuration persists. The main consequence of this analysis is that it is possible to produce closed dielectrophoretic cages not corresponding to electric field relative minimums as is evident from the following example.

We consider a spatial domain Ω. We assume:

$$\forall\, i, \forall\, (x, y, z) \notin \Omega, \vec{\nabla}U_i^{dep}(x, y, z, \omega) \neq 0 \tag{25}$$

and:

$$\forall\, i \text{ pari } U_i^{dep}(x, y, z, \omega) = U_{i+1}^{dep}(-x, -y, -z, \omega) \tag{26}$$

then:

$$\sum_{k\in\{x,y,z\}}\frac{\partial U_i^{dep}(x, y, z, \omega)}{\partial k}\hat{k} = 0. \tag{27}$$

In the case of total force:

$$\sum_{k\in\{x,y,z\}}\left(\sum_{i=1}^{n}\frac{\partial U_i^{dep}(x, y, z, \omega)}{\partial k}\right)\hat{k} = 0. \tag{28}$$

This shows that it is possible to produce closed dielectrophoretic cages even without a local minimum of the electric field.

It should be observed that the overlapping of the effects of various configurations of potential is a consequence of their application in time succession. If, in fact, these configurations were applied simultaneously, the resulting total force would be different. It is possible to demonstrate, for example, that the sum of configurations of potentials that provide, point by point, a constant electric potential value can give rise to a non-null dielectrophoretic force if applied individually in time succession.

As a further generalisation of the theory, we consider the case in which the electric field is periodic; in this case it is possible to demonstrate that the resulting dielectrophoretic force is the following:

$$\vec{F}(x, y, z, \omega) = \sum_{i=1}^{n}\left\{\frac{\Delta t_i}{T}\sum_{j=1}^{+\infty}\left[\beta_j(\omega_j)\vec{\nabla}E_{i,RMS}^2(x, y, z, \omega_j)\right]\right\} \tag{29}$$

Method for the Production of Closed Dielectrophoretic Cages Obtained by Means of an Electrode Array It is an object of the present invention to provide a method for producing closed dielectrophoretic cages (not necessarily corresponding to local minimums of the respective dielectrophoretic potential) by means of which to trap electrically neutral particles in a stable manner; this is done by applying a succession of configurations of electric potentials to an array of electrodes; said potentials are characterised preferably but not exclusively by periodic functions with null mean value in phase or in counter-phase; each of said potential configurations can give rise to an electric field which has one or more electric field local minimums or may not have any electric field local minimum; depending on the type of configurations applied and the time sequence in which they follow one another, the effect of said configurations can give rise to one or more of the following phenomena:

closed dielectrophoretic cages
rotating fields
travelling waves
dielectrophoretic parasite cages
electro-thermal-flow It is possible to determine an appropriate, set of configurations to be applied to the electrode array following an appropriate time succession which enables or inhibits each of the effects listed; as a non-limiting example for the purposes of the present invention, some examples of possible different successions that can be used are described below:

- deterministic periodical: the succession of configurations follows a periodic trend so that each configuration is, applied for a constant time duration and is repeated after a period of time M common to all the configurations;
- chaotic: the succession of configurations follows a non-deterministic trend. The duration of each configuration in turn can be constant or random.

Figure 3A:
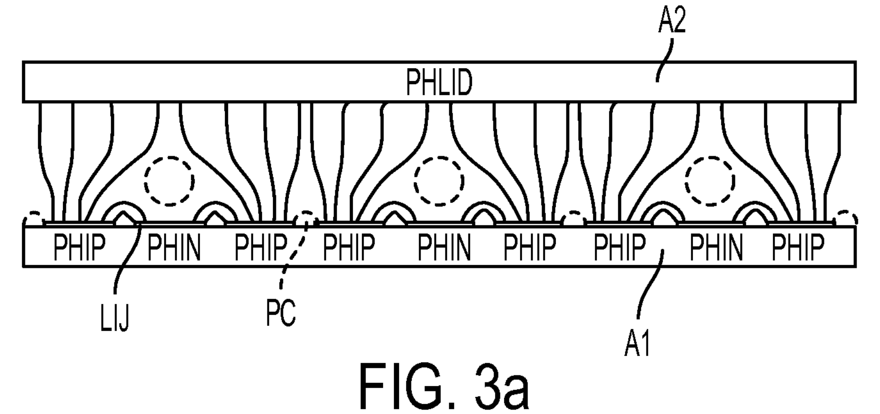
FIG. 3 shows the configurations of potentials to produce closed dielectrophoretic cages in a one-dimensional array of electrodes according to the known art (a) and according to an aspect of the present invention (b) and (c)
Figure 3B:
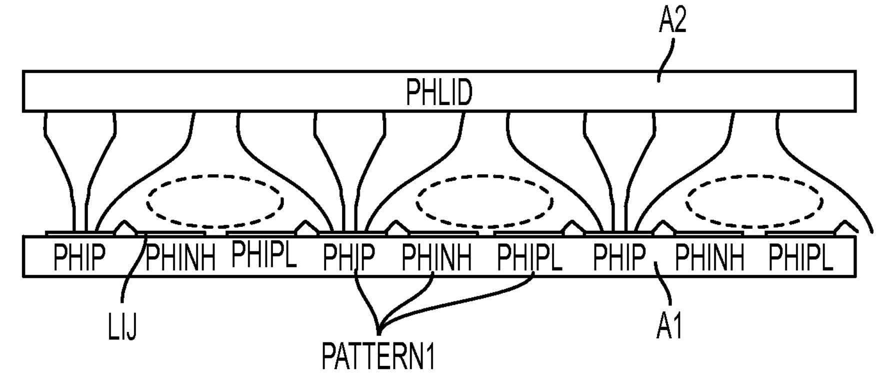
Figure 3C:
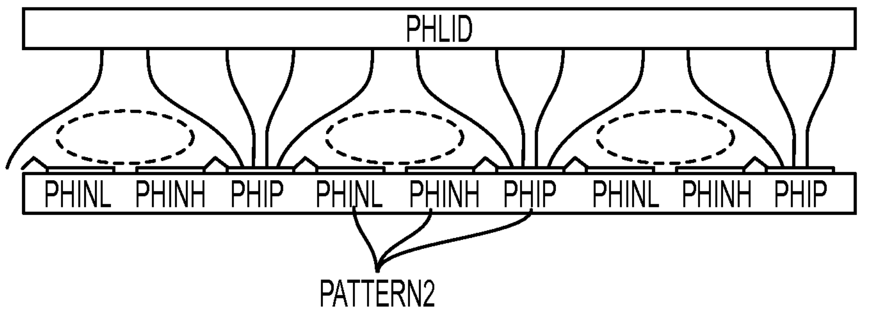

By way of example FIG. 3(*a*) shows a configuration of potentials in negative phase (PHIN and PHILID) and positive phase (PHIP) applied to the electrodes (LIJ) of a device, such as the one illustrated in FIG. 1 (which in FIG. 3 is illustrated in a vertical section), in order to produce an array of dielectrophoretic cages (S1). As a consequence of this, parasite cages (PC) occur (between adjacent electrodes having the same phase), which can trap particles in a stable manner.

Figure 4A:
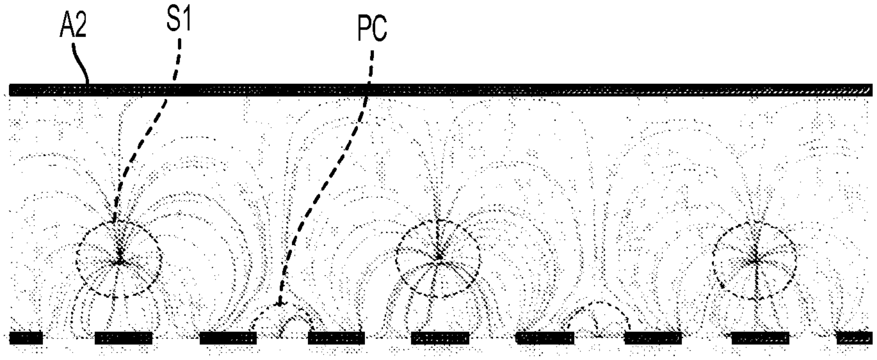
FIG. 4 shows the dielectrophoretic field lines according to the known art (a) and according to the present invention (b)
Figure 4B:
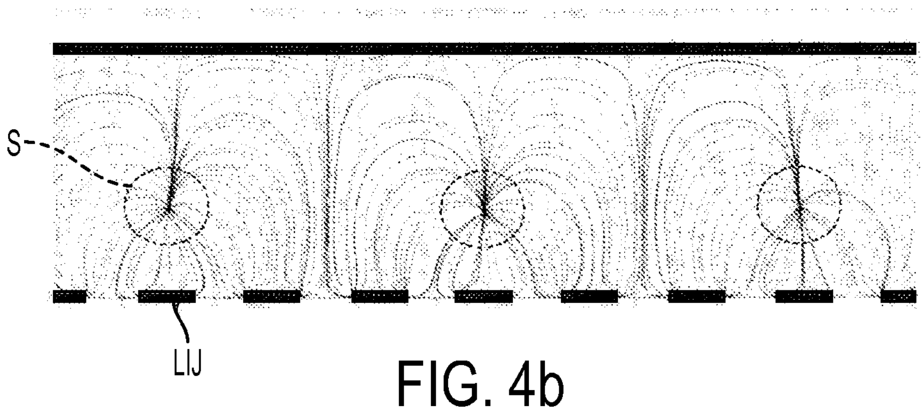

According to the present invention said parasite cages can be eliminated by applying an appropriate series of configurations in time succession; in the case in point, two configurations (pattern1 and pattern2) shown in FIG. 3(*b*) and FIG. 3(*c*) are sufficient; said configurations are applied each for a time interval of T/2, with T chosen in accordance with the theory illustrated; in this regard the following potentials are used: PHINL, PHINH, PHIP and PHILID, where PHINL and PHINH correspond to two potentials both in negative phase, but with different amplitude, for example one (PHINH–H=high) twice the other (PHINL–L=low). From the comparison of the effect of the various configurations, represented by the broken lines, shown in FIGS. 3(*a*),(*b*),(*c*) in which the same electrodes are vertically aligned, the effect of the application of the two configurations pattern1 and pattern2 is evident, in which, corresponding to the same electrode to which PHINH is applied and which corresponds to an electrode to which in FIG. 3(*a*) (state of the art) the potential PHIN is applied, PHINL potentials are applied first to the electrode immediately adjacent on the right (pattern1) and then to the electrode immediately adjacent on the left (pattern2), while PHINL is applied to the electrode in one of the two configurations, and in the other configuration PHIP is applied (or the same potential in counter-phase, which in the case of the state of the art of FIG. 1(*a*) is always applied to both said electrodes). As a result of the application in time sequence of said two configurations, the dielectrophoretic cages closed but "deformed"—in the sense that they are "elongated" on two adjacent electrodes—which form as a consequence of application of the configurations pattern1 and pattern2 generate the same effect as a closed dielectrophoretic cage located on one single electrode (PHINH in the case illustrated), which corresponds to the same electrode on which the equivalent closed cage S1 is located in FIG. 1(*a*) (to which PHIN is applied), but without the generation of parasite cages PC, which cannot be formed as the flow lines of the electric field close up in both configurations, pattern1 and pattern2, in a different way from the "traditional" configuration of FIG. 1(*a*), thus preventing the formation Of closed PC cages therefore able to trap any particles present between the electrodes A2 and LIJ. FIG. 4 shows the lines of the dielectrophoretic field resulting from the simulations in the case in which a static configuration (a) is applied, as in the state of the art, and in the case in which dynamic configurations (b) are applied, according to the invention. In both cases dielectrophoretic cages are present; however, in the first case parasite cages are also present while in the second case there are no parasite cages.

Figure 6:
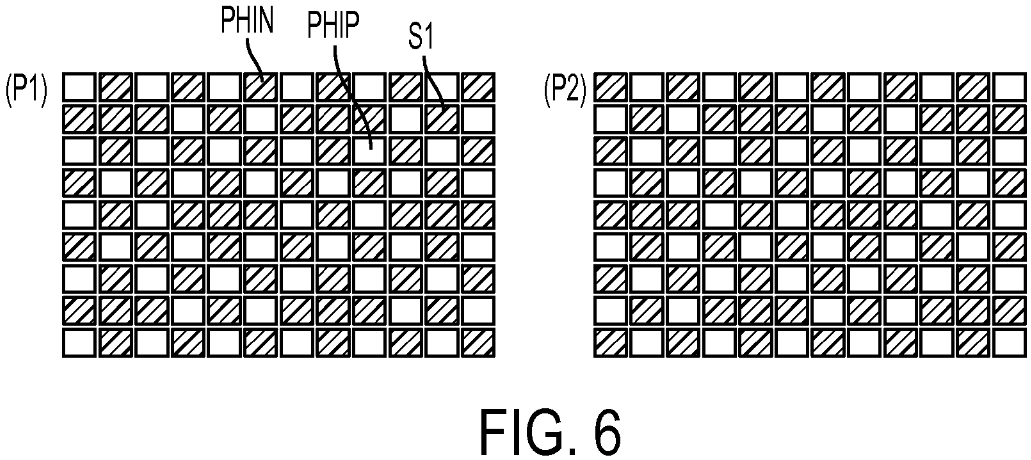
FIG. 6 shows a possible set of configurations of potentials to produce closed dielectrophoretic cages according to the present invention in a two-dimensional array of electrodes.

It is obvious that alternative configurations can be determined to obtain similar results in devices with a different number and form of electrodes arranged in both one and two dimensions. By way of example FIGS. 6, 7, 9, 10 show some examples of possible configurations applied in periodic sequence for the realisation of an array of closed dielectrophoretic cages in two dimensions. FIG. 6 illustrates (this time in a plan view) a situation analogous to that of FIG. 3(*b, c*) in which two alternate configurations P1 and P2 are applied on each half of the electrodes surrounding the electrode on which the cage S1 will be realised, but only two potentials of the same amplitude PHIN and PHIP are used, as in the "traditional" case. All the dark-coloured electrodes of the array have the potential PHIN applied, while the other electrodes of the array (light-coloured) have the potential PHIP applied.

In this case, the effect of the time sequence application (the same as FIG. 3(*b, c*)) of the configurations P1 and P2 illustrated necessarily leads to the formation, in the case of both configurations P1 and P2, of non-closed (open) dielectrophoretic cages as they are not located in an electric field minimum; however, the result of the application in time sequence of configurations P1 and P2 is the generation of a closed dielectrophoretic cage S1 on the only electrode to which in both configurations P1 and P2 the same potential PHIN remains applied (electrode always grey).

Figure 7:
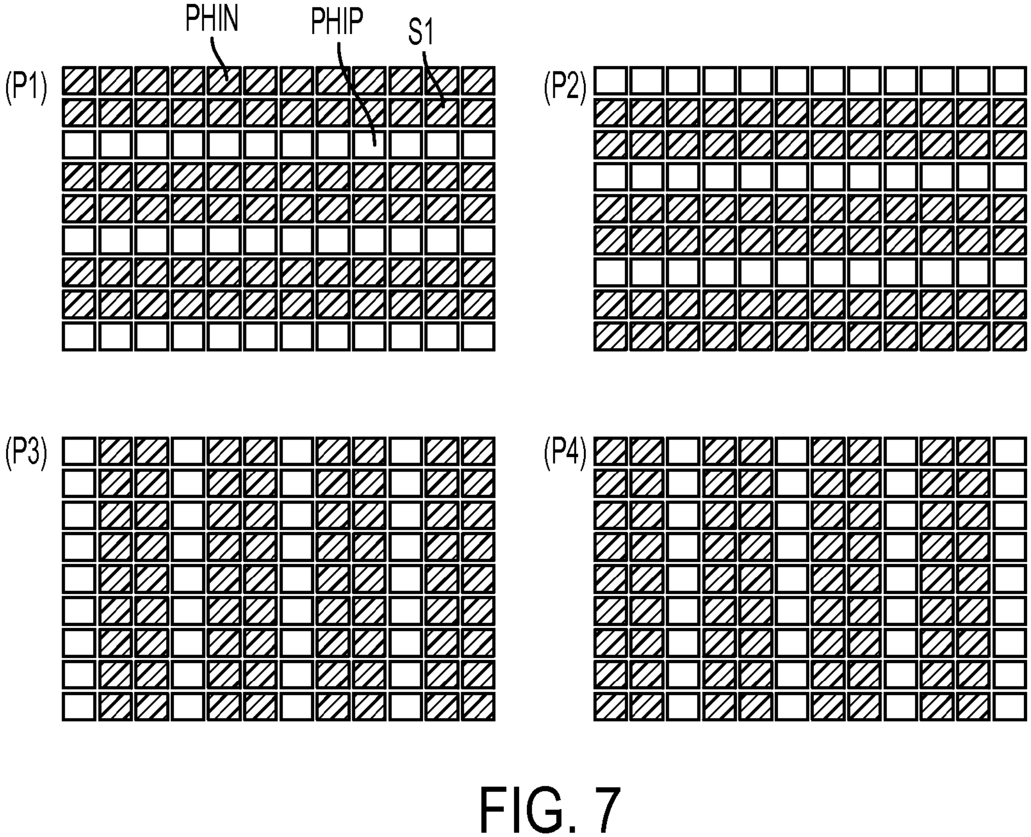
FIG. 7 shows a further set of configurations of potentials to produce closed dielectrophoretic cages according to the present invention in a two-dimensional array of electrodes.
Figure 9:
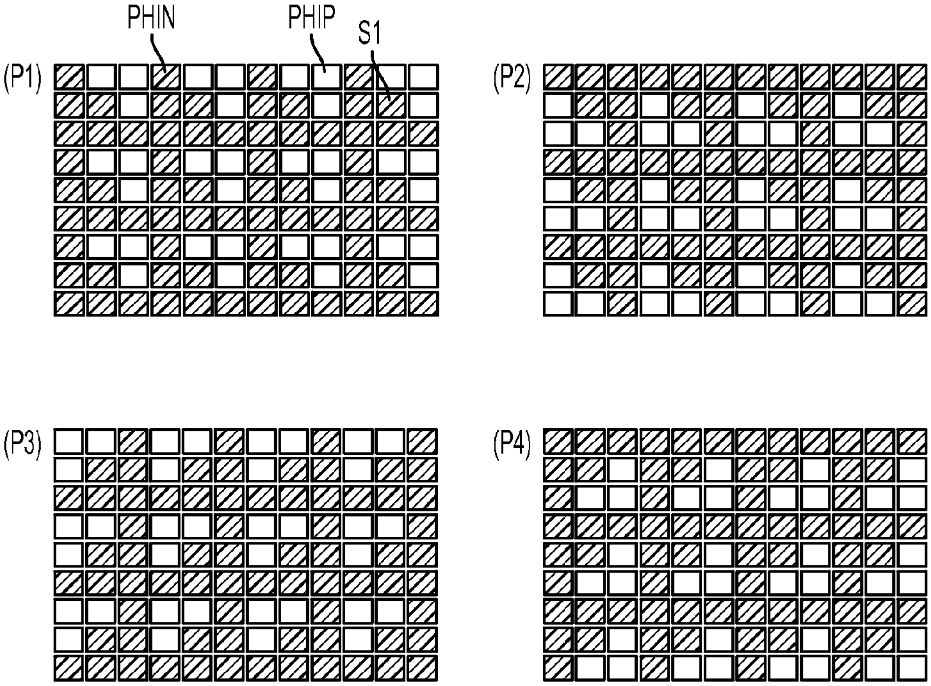
FIG. 9 shows a further set of configurations of potentials to produce closed dielectrophoretic cages according to the present invention in a two-dimensional array of electrodes.
Figure 10:
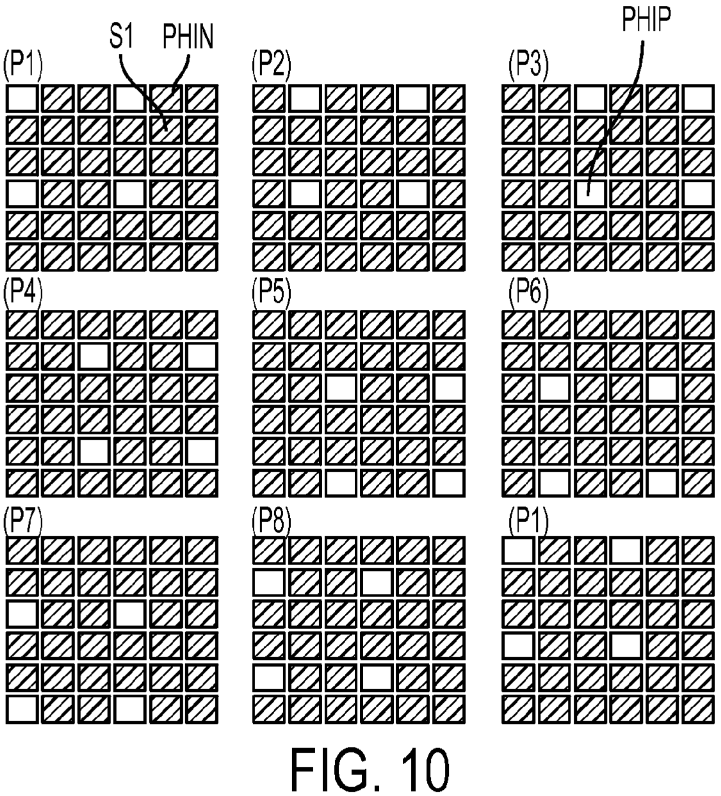
FIG. 10 shows a further set of configurations of potentials to produce closed dielectrophoretic cages according to the present invention in a two-dimensional array of electrodes.

FIGS. 7 and 9 show cases of application of four different configurations (patterns) P1, P2, P3, P4 alternating the two potentials PHIP and PHIN on the various electrodes; the configurations adopted are in turn different in FIG. 7 and in FIG. 9. FIG. 10 illustrates the case in which eight different configurations are applied P1, . . . P8, in practice "rotating" the electrode to which the PHIP potential in counter-phase (light-coloured) is applied each time with respect to the electrode on which the cage S1 is positioned.

Figure 5:
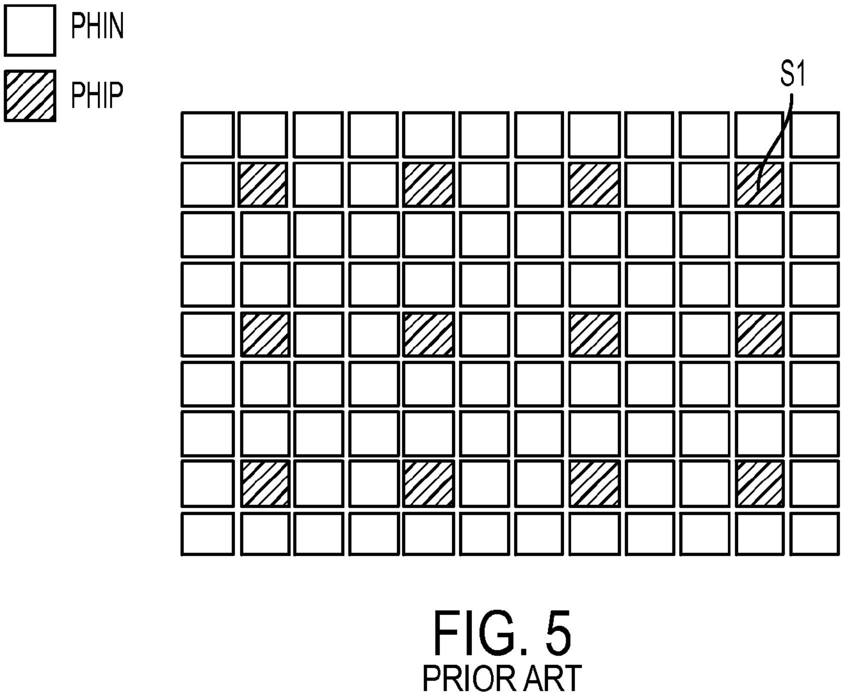
FIG. 5 PRIOR ART
FIG. 5 shows the configurations of potentials to produce closed dielectrophoretic cages according to the known art in a two-dimensional array of electrodes.
Figure 8:
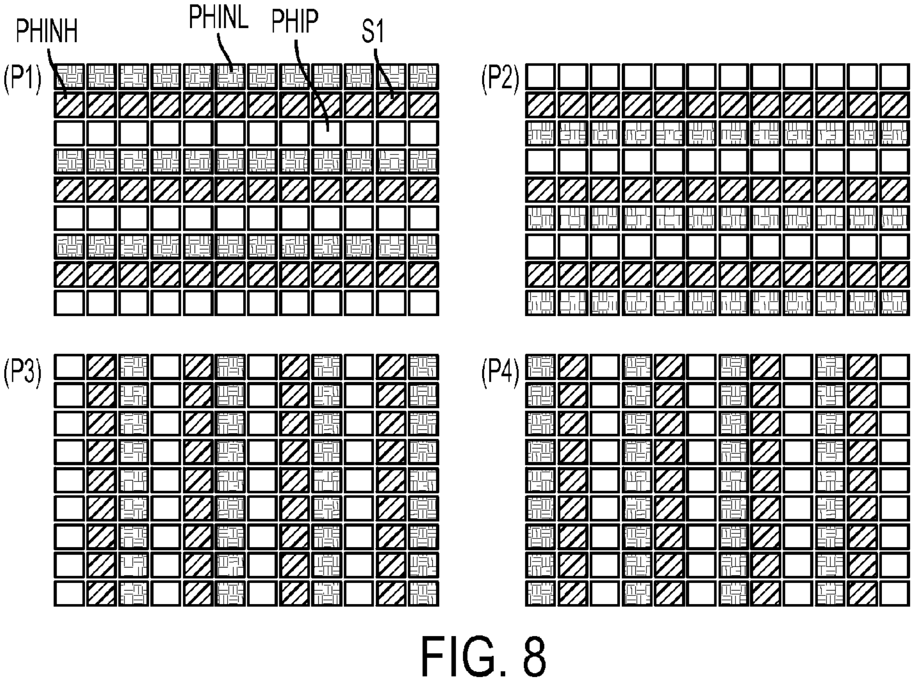
FIG. 8 shows a further set of configurations of potentials to produce closed dielectrophoretic cages according to the present invention in a two-dimensional array of electrodes.

Lastly it is also possible (FIG. 8) to use a set of "mixed" configurations, in which two potentials in negative phase of different amplitude are used (PHINL and PHINH—as in the case of FIGS. 3*b, c*) applied in time succession to the electrodes around the same electrode to which PHINH (darker grey) is always applied and on which the closed cage S1 is realised, together with PHIP counter-phase (light-coloured) potentials. In practice, by applying the method of the invention, the same result is obtained as the one obtained by means of a static configuration according to the known art, shown in FIG. 5, i.e. the generation of closed dielectrophoretic cages in which single particles can be trapped; the main advantage of the method according to the invention with respect to the known art is the possibility of using smaller electrodes, maintaining constant the spatial repetition pitch between the electrodes and consequently increasing the impedances between the electrodes, thus reducing the power dissipation without causing an increase in the dimensions of the basin of attraction of the parasite cages and, at the same time, without causing the generation of parasite cages.

Basically (FIG. 15), for any succession of field configurations PEQp1, . . . PEQpn applied in time T (FIGS. 15(*a*), (*b*) and (*c*)), the final result obtained is always that of a sort of "equivalent configuration" (FIG. 15(*d*)) which can also be determined graphically, in which the centre of the closed dielectrophoretic cage actually obtained (marked by the circle with the cross) is in the "centre of gravity" of the n configurations applied in succession, corresponding, in the case in point, to the centre of gravity of the triangle obtained by joining the centres of the electrodes to which the potential PEQp1, . . . n has been applied in succession.

Obviously once the closed cages S1 have been generated according to the method of the invention, they will be movable along a controlled path, which can be pre-set during programming of the electrodes, by selectively varying the voltage configurations applied to the electrodes of the array so as to generate, in sequence, a succession of closed cages along said controlled path. All the numerous methods described in the state of the art based on the displacement/manipulation of closed dielectrophoretic cages containing one or more particles can therefore be implemented, operating according to the method described to obtain the generation of closed cages.

Apparatus for the Manipulation of Particles by Overlapping the Effects of Dielectrophoretic Configurations Is also an object of the present invention to provide an apparatus or device by means of which the method described can be realised in an advantageous manner. Due to the need to rapidly alternate over time various configurations (patterns) of voltages (Vp, Vn) applied to the electrodes, there is the problem of updating the configurations. If the electrode array is very large (e.g. 10,000 or 1,000,000) the time for reprogramming the array may be incompatible with the alternation speed of the configurations. It is therefore desirable to have, for each micro-site associated with the electrodes, a memory cell which regulates the current configuration, so that the alternation of configurations can be obtained without reintroducing the data from the outside in serial mode, but simply by globally switching the programming between the various configurations stored locally.

Figure 12:
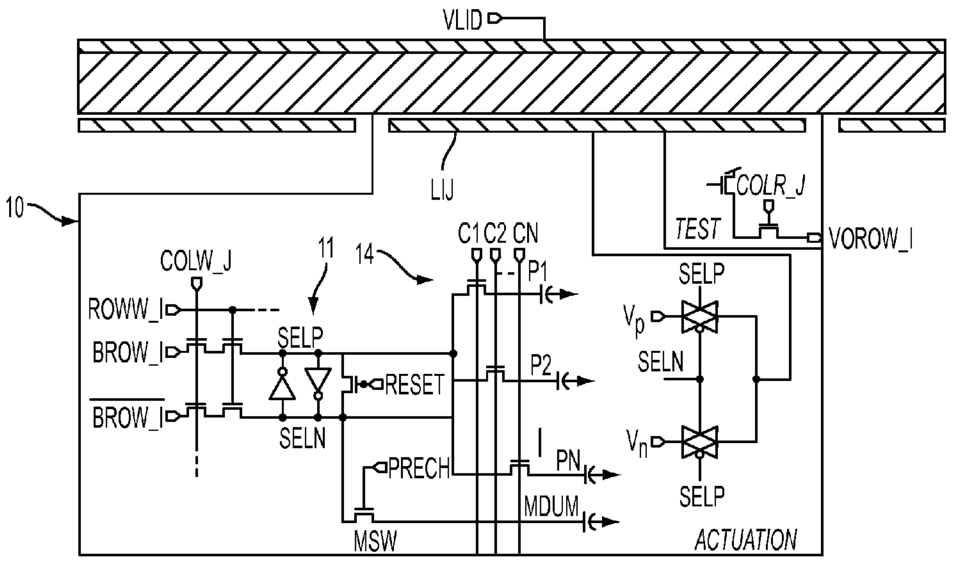
FIG. 12 shows a schematic preferential embodiment of a device according to the present invention, in particular suitable for the implementation of the methods based on the use of the configurations of potentials illustrated in the FIGS. from 6 to 10.
Figure 13:
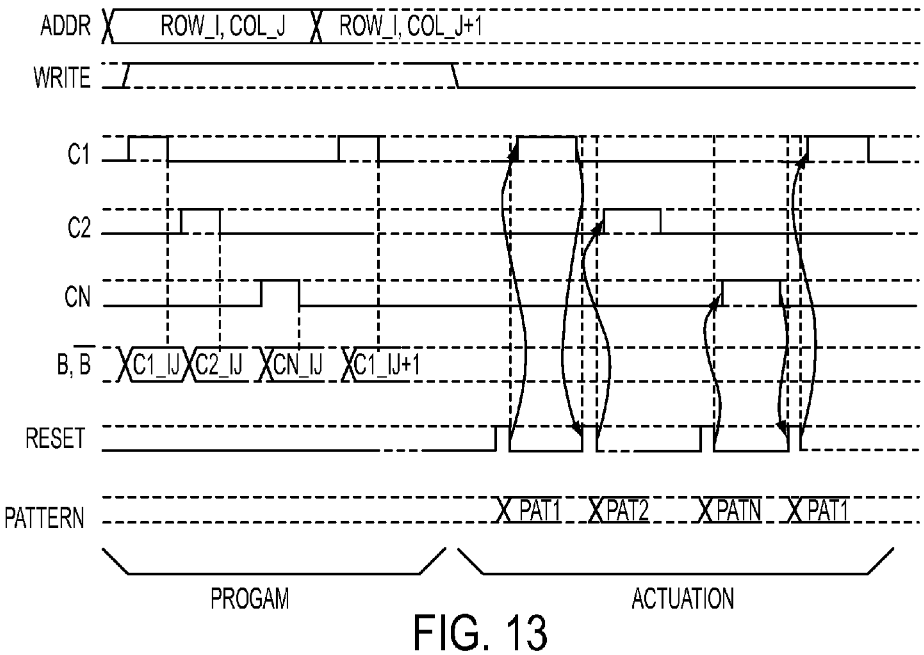
FIG. 13 shows the waveforms for the use of a preferential embodiment of the device according to the present invention.

FIG. 12 shows a circuit scheme according to the present invention, particularly suitable for the purpose of rapidly alternating various configurations. The actuation part contains an addressing circuit 10 for a static memory 11 consisting of two feedback inverters, the outputs of which (SELP, SELN) determine whether the voltage Vp or Vn is applied to the electrode (LIJ). The n configurations necessary for operating the circuit are stored locally by means of dynamic memories 14. The dynamic memories 14 are refreshed every time the configuration is activated. FIG. 13 shows the sequence of waveforms relative to programming and actuation.

The dynamic memories 14 are loaded initially during the programming phase, and are used periodically during the actuation phase. Before every use, voltages SELP, SELN are re-set to the value corresponding to the unstable equilibrium point of the static memory cell and, after deactivation of the RESET, closing of the switch which connects the nodes of the static RAM to the capacitors constituting the dynamic memory causes the switching of the static memory towards the new configuration and the refreshing of the dynamic memory.

Dynamic memories can consist of pairs of capacitors (P1, M1, . . . PN, MN), as in FIG. 12, which could be produced—to use a CMOS standard technology—with a transistor with drain and source short-circuited (as earth terminal) and with the gate as another plate of the capacitor.

An even more compact embodiment (FIG. 14) provides for the use of one single capacitor (P1, . . . PN) for each configuration plus one single dummy capacitor (MDUD) connected to the other output of the static memory 11, which is preloaded during the RESET phase in the unstable equilibrium point of the static memory 11. The preload occurs by activating the PRECH signal during the active RESET phase. PRECH can then be deactivated and reactivated immediately after, simultaneously with one of the selection signals of the configuration (C1, . . . , CN).

The equipment described above in two preferred embodiments permits simultaneous activation of the sequence configuration on the whole electrode array, simply by activating the global signals RESET and C1, CN as appropriate.

For testing the circuit it is also advisable to realise for each electrode $L_{IJ}$ an auxiliary test circuit (TEST), which indicates by means of a source follower, line by line, the voltage applied to the electrode of a selected column.

Figure 11:
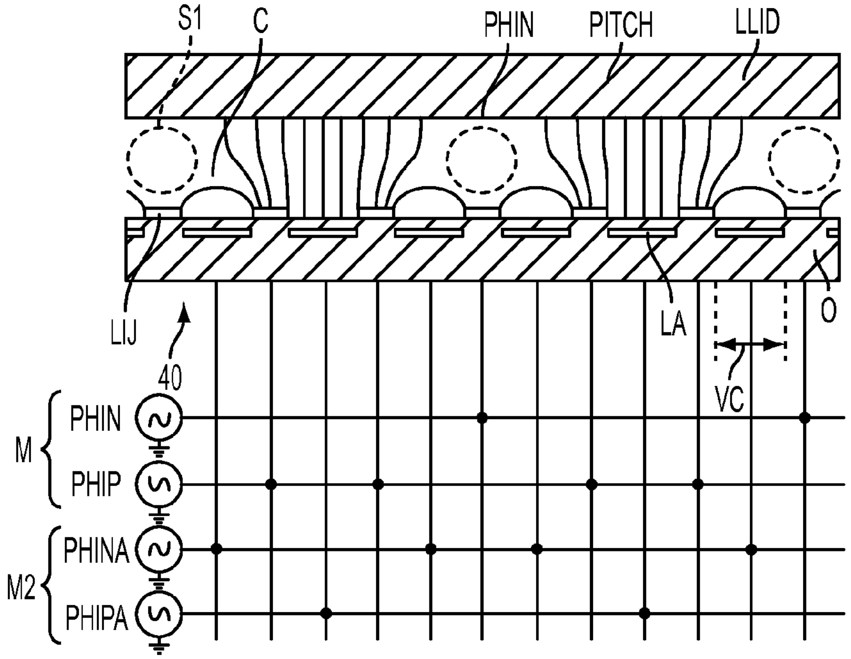
FIG. 11 shows a sectioned elevation view of a device consisting of a one-dimensional array of electrodes using auxiliary electrodes.

Method for the Reduction of Power Dissipation and Effects of Parasite Cages by Means of Auxiliary Electrodes A further method (and device) for reducing the effects of the associated parasite cages is shown schematically in FIG. 11. In said case auxiliary potentials are used in addition to the normal potentials applied according to the state of the art; the function of the auxiliary potentials is that of increasing the intensity of the field corresponding to the regions containing electrodes to which potentials with the same phase are applied; these regions in fact normally determine the creation of parasite cages; when reciprocally in-phase potentials are applied, a local minimum of the electric field corresponding to a minimum of the dielectrophoretic potential is created in this region.

According to the present invention it is necessary to apply a further potential (PHIPA) with the same phase but greater amplitude; the amplitude of the potential in particular can be chosen in order to have, on the surface of the chip, an amplitude equal to or greater than the potential PHIP; in this way there is no electric field minimum in this region. Said auxiliary potentials assume null value or negative phase PHINA or can remain floating in the regions in which opposite phases are applied; in fact, parasite cages do not normally occur in said regions; variations are possible to the number, form and relative position of the electrodes used to apply said auxiliary potentials just as variations are possible to the amplitude, frequency and phase of the auxiliary potentials according to the present invention.

Apparatus for the Reduction of Power Disipation and of the Effects of Parasite Cages by Means of Auxiliary Electrodes It is also an object of the present invention is to provide an apparatus which permits realisation of the method described above. With reference to FIG. 11, for the manipulation of particles by means of closed dielectrophoretic cages S1, a device is used which comprises an array of first electrodes Lij which can be individually addressed and activated, at least one second electrode LLID positioned facing towards and spaced apart from the first electrodes Lij, a chamber C suitable for containing in suspension the particles in a fluid medium, and means M to generate around at least one particle an electric field variable over time by means of the electrodes Lij and the electrode LLID.

In the case in point the chamber C is delimited between the array of first electrodes Lij and the second electrode LLID; the means M include means (known and not illustrated for the sake of simplicity) for applying to at least one first group of first electrodes Lij of the array, at each of which a cage S1 will be generated, a voltage configuration PHIN in phase with a voltage configuration PHIN applied to the electrode LLID; and for applying to at least one second group of electrodes Lij immediately surrounding each cage S1 to be generated a voltage configuration PHIP in counter-phase with the voltage configuration applied to the second electrode LLID.

According to the invention, the device furthermore comprises means 40 to generate a localised increase in intensity of the electric field in regions of the chamber C containing, positioned immediately adjacent to one other, electrodes Lij to which voltage configurations having identical phase are applied, comprising an array of third electrodes $L_A$ arranged near the electrodes Lij, each substantially corresponding to a separation and insulation gap VC between one respective pair of first adjacent electrodes Lij.

The device furthermore comprises means M2 for selectively applying to at least one selected group of third electrodes $L_A$ arranged near first electrodes Lij to which voltage configurations PHIP (or PHIN) with identical phase are applied during use, a voltage configuration PHIPA (or PHINA) having phase identical to the one applied to said first electrodes, but with greater amplitude.

The array of first electrodes Lij and the array of third electrodes $L_A$ are supported by the same electrically insulating substrate O, at different distances from an outer surface of the substrate delimiting the lower bound of the chamber C. The third electrodes $L_A$ are preferably arranged below the first electrodes Lij with respect to the cited outer surface of the substrate O.

The invention claimed is:

1. A method for the manipulation of particles comprising:

a step of generating at least one field of force configuration using at least an array of first and second main electrodes, said at least one field of force configuration creating, in at least one first spatial point in the vicinity of which at least one particle of said particles is located, at least one point of stable equilibrium that traps said at least one particle, said at least one field of force configuration being configured such that:

the at least one point of stable equilibrium is generated at a first field minimum localized at said first main electrodes of said array, and second field minima are generated in at least one group of second spatial points located in the vicinity of said at least one point of stable equilibrium and at regions arranged between two adjacent second main electrodes; and a step of generating a localised increase in the intensity of said field of force at said second field minima using an array of first and second auxiliary electrodes each arranged in a gap between adjacent first and second main electrodes.

2. The method as claimed in claim 1, wherein:

the step of generating at least one configuration of field of force comprises the step of generating, by said array of first and second main electrodes, an electric field to create in the vicinity of said first spatial point and at one of said first main electrodes said at least one point of stable equilibrium to trap said at least one particle, said at least one point of stable equilibrium being produced by a combination of:

applying (1) a first electric potential to one of said first main electrodes, and (2) a second electric potential to at least one group of second main electrodes of said array of first and second main electrodes immediately surrounding said first spatial point arranged at said one of said first main electrodes, said second electric potential being in counter-phase with respect to that of said one of said first main electrodes, and the step of generating said localised increase in the intensity of said field of force at said second field minima being carried out by applying an auxiliary electric potential to said at least said second auxiliary electrodes that are immediately adjacent to said second main electrodes that have the same second potential, said auxiliary electric potential being in phase with said second electric potential.

3. The method as claimed in claim 2, wherein the step of generating at least one configuration of field of force comprises:

generating said at least one point of stable equilibrium by applying an electric field by said array of said first and second main electrodes and by at least one third electrode positioned facing towards and spaced apart from said array of said first and second main electrodes to delimit between said at least one third electrode and said array of first and second main electrodes a chamber suitable for containing in suspension said particles in a fluid, said electric field being around said at least one particle and variable in time, wherein said array of said first and second main electrodes are individually addressable and operated, and wherein the generating said at least one point of stable equilibrium further comprises applying (1) to at least one of said first main electrodes a voltage configuration in phase with a voltage configuration applied to said at least one third electrode, and (2) to a group of second main electrodes of said array immediately surrounding said point of stable equilibrium a voltage configuration in counter-phase with the voltage configuration applied to the at least one third electrode.

4. The method as claimed in claim 1, wherein said point of stable equilibrium is defined by a closed dielectrophoretic cage.

5. The method as claimed in claim 3, wherein said localised increase in intensity of said electric field is obtained by said array of said first and second auxiliary electrodes, which are arranged in the vicinity of said first and second main electrodes, each of said first and second auxiliary electrodes substantially corresponding to a separation and insulation gap between a respective pair of adjacent electrodes of said array of first and second main electrodes.

6. The method as claimed in claim 5, wherein the step of generating said localised increase in the intensity of said electric field comprises applying, to a selected group of said first and/or second auxiliary electrodes positioned in the vicinity of said first and/or second main electrodes to which voltage configurations with identical phase are applied, a voltage configuration having a phase identical to the one applied to said first and/or second main electrodes, but with greater amplitude.

7. The method as claimed in claim 6, wherein said array of first and second main electrodes and said array of first and second auxiliary electrodes are on a same electrically insulating substrate, at different distances from an external surface of the substrate delimiting a lower bound of said chamber.

8. The method as claimed in claim 7, wherein said first and second auxiliary electrodes are positioned below the first and second main electrodes with respect to said external surface of the substrate, the voltage configuration applied to said selected group of auxiliary electrodes being selected with amplitude such that, on said external surface of the substrate, an electric potential is established that is in-phase with said first and/or second main electrodes to which voltage configurations with identical phase are applied and having an amplitude equal to or greater than those of the electric potential established on said external surface of the substrate by said first and/or second main electrodes to which voltage configurations with identical phase are applied.

9. The method as claimed in claim 6, wherein said selected group of first and second auxiliary electrodes is selected so as to generate said localised increase in the intensity of said electric field only between the electrodes of said group of second main electrodes.

10. A device for the manipulation of particles comprising:

first means for creating a succession of a plurality of different field of force configurations over a time interval, wherein each said field of force configuration of the succession taken individually is insufficient for creating a point of stable equilibrium for at least one particle; and second means for (a) regulating said succession of a plurality of different field of force configurations in said time interval such that the succession creates said at least one point of stable equilibrium suitable for trapping the at least one particle, and (b) simultaneously preventing the creation of undesired points of stable equilibrium in at least one group of second spatial points located in the vicinity of said at least one point of stable equilibrium, so that the plurality of field of force configurations overlap to effectively create a single field of force acting on the at least one particle, wherein the single field of force effectively acts on said at least one particle in a different manner from the each configuration of said plurality of field of force configurations taken individually result in the field of force trapping the at least one particle at approximately the same point during the time interval.

11. The device as claimed in claim 10, wherein said field of force is a spatially non-uniform continuous or discontinuous electric field.

12. The device as claimed in claim 10, wherein said first means for the generation of at least one field of force configuration comprise one electrode array of first and second electrodes which can be individually addressed and operated; and said second means comprise means for applying to at least one of said first electrodes of said electrode array and to second electrodes of said electrode array immediately adjacent to said at least one of said first electrodes a succession over time of different electric potential configurations to form a point of stable equilibrium at a level of said first electrode and, simultaneously, preventing a potential having the same phase from being applied to adjacent electrodes of said electrode array in each field of force configuration of said time succession of configurations thereby preventing creation of undesired points of stable equilibrium.

13. The device as claimed in claim 12, further comprising:

at least one third electrode positioned facing towards and spaced apart from said first and second electrodes;

one chamber suitable for containing in suspension said particles in a fluid, said chamber being delimited between said array of first and second electrodes and said at least one third electrode; and means for generating around said at least one particle an electric field variable in time using said electrodes; wherein said means for generating said electric field comprise, in combination:

(i) means for applying to at least one of said first electrodes of said electrode array, at which a stable point of equilibrium is to be generated, a voltage configuration in phase with a voltage configuration applied to said at least one third electrode; and (ii) means for applying to a group of second electrodes of said electrode array immediately surrounding said point of stable equilibrium a succession over time of different voltage configurations so that, in each configuration of said plurality of field of force configurations, at least one but not all of the second electrodes of said group is in counter-phase with the voltage configuration applied to the third electrode.

14. The device as claimed in claim 13, wherein said second means include said means for applying to said group of second electrodes a succession over time of different voltage configurations and further comprise, for each said first and/or second electrode of said array of electrodes:

addressing means, using static memory, suitable for determining the selective application to a respective first or second electrode of a voltage configuration selected from a group of possible voltage configurations; and dynamic memory media suitable for determining a pre-established time succession of switching operations of the static memory means to determine said selective application to the electrode of a voltage configuration chosen from said group of possible voltage configurations according to information previously stored in said dynamic memory media so that in each configuration of said plurality of field of force configurations at least one but not all of the second electrodes of said group is in counter-phase with the voltage configuration applied to the third electrode.

15. The device as claimed in claim 14, further comprising means for resetting the static memory means on the basis of a reset signal and means for refreshing the dynamic memory media after the de-activation of said reset signal and said switching of the static memory means.

16. The device as claimed in claim 14, wherein said dynamic memory media comprise a pair of capacitors for each voltage configuration forming part of said time succession of different voltage configurations.

17. The device as claimed in claim 14, wherein said dynamic memory media comprise one single first capacitor for each voltage configuration forming part of said time succession of different voltage configurations, connected to a first output of the static memory means; one single second capacitor connected to a second output of the static memory means; and means for pre-loading said second capacitor during at least part of the step of resetting of the static memory means.

18. A device for the manipulation of particles comprising:

means for the generation of at least one configuration of a field of force acting on at least one particle of said particles, wherein said means comprise:

first means for generating at least one field of force creating in at least one first spatial point, in the vicinity of which said at least one particle is located, at least one point of stable equilibrium to trap said at least one particle, said first means comprising an array of first and second main electrodes for generating the at least one point of stable equilibrium at a first field minimum localized at said first main electrodes of said array and for generating second field minima in at least one group of second spatial points located in the vicinity of said at least one point of stable equilibrium and at regions arranged between two adjacent second main electrodes; and second means for generating a localised increase in the intensity of said field of force at said second field minima, said second means comprising an array of first and second auxiliary electrodes arranged each in a gap between first or second adjacent main electrodes.

19. The device as claimed in claim 18, wherein said first means comprise:

said array of first and second main electrodes, which are individually addressable and operated, at least one third electrode positioned facing towards and spaced apart from the first electrodes, a chamber suitable for containing in suspension said particles in a fluid medium, said chamber being delimited between said array of first and second electrodes and said at least one third electrode, and means for generating around at least one said particle an electric field variable in time using said electrodes, including means for applying to at least one group of said first electrodes of said electrode array each corresponding to a point of stable equilibrium to be generated, a voltage configuration in phase with a voltage configuration applied to said at least one third electrode; and means for applying to at least one group of said second electrodes immediately surrounding said point of stable equilibrium to be generated a voltage configuration in counter-phase with the voltage configuration applied to the third electrode, wherein said second means comprise said first and second auxiliary electrodes arranged according to an array and means for applying to said first and second auxiliary electrodes voltage configurations in-phase with voltage configurations applied to said first or second main electrodes immediately adjacent to a respective first or second auxiliary electrode.

20. The device as claimed in claim 19, wherein said means for generating a localised increase in the intensity of said electric field comprise an array of auxiliary electrodes positioned in a vicinity of said first and second main electrodes, each substantially corresponding to a separation and insulation gap between a respective pair of first and/or second adjacent electrodes.

21. The device as claimed in claim 20, further comprising means for selectively applying to at least one selected group of first or second auxiliary electrodes positioned in the vicinity of first and/or second main electrodes to which, in use, voltage configurations having identical phase are applied, a voltage configuration having phase identical to the one applied to said first and/or second electrodes, but having a greater amplitude.

22. The device as claimed in claim 20, wherein said array of first and second main electrodes and said array of first and second auxiliary electrodes are supported by the same electrically insulating substrate, at different distances from an external surface of the substrate delimiting the lower bound of said chamber.

23. The device as claimed in claim 22, wherein said first and second auxiliary electrodes are positioned below said first and second main electrodes with respect to said external surface of the substrate.

* * * * *